United States Patent
Ouderkirk et al.

(10) Patent No.: US 11,740,408 B2
(45) Date of Patent: Aug. 29, 2023

(54) CURVED GRADED-INDEX WAVEGUIDES AND METHODS OF MAKING THE SAME

(71) Applicant: Meta Platforms Technologies, LLC, Menlo Park, CA (US)

(72) Inventors: Andrew John Ouderkirk, Kirkland, WA (US); Sheng Ye, Redmond, WA (US); Tingling Rao, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/082,361

(22) Filed: Dec. 15, 2022

(65) Prior Publication Data

US 2023/0117679 A1 Apr. 20, 2023

Related U.S. Application Data

(62) Division of application No. 17/180,608, filed on Feb. 19, 2021, now Pat. No. 11,585,980.

(60) Provisional application No. 63/123,853, filed on Dec. 10, 2020.

(51) Int. Cl.
*G02B 6/122* (2006.01)
*G02B 6/125* (2006.01)
*G02B 6/138* (2006.01)
*G02F 1/065* (2006.01)

(52) U.S. Cl.
CPC ........... *G02B 6/1221* (2013.01); *G02B 6/125* (2013.01); *G02B 6/138* (2013.01); *G02F 1/065* (2013.01)

(58) Field of Classification Search
CPC ...... G02B 6/1221; G02B 6/125; G02B 6/138; G02F 1/065
See application file for complete search history.

(56) References Cited

U.S. PATENT DOCUMENTS

| | | | |
|---|---|---|---|
| 9,733,475 B1 | 8/2017 | Brown et al. | |
| 10,437,064 B2* | 10/2019 | Popovich | G02B 6/0016 |
| 10,509,155 B2 | 12/2019 | Alexander | |
| 10,737,450 B1 | 8/2020 | Ouderkirk | |
| 10,775,633 B1 | 9/2020 | Lee et al. | |
| 10,823,887 B1 | 11/2020 | Calafiore et al. | |
| 2019/0064735 A1 | 2/2019 | Waldern et al. | |

(Continued)

OTHER PUBLICATIONS

Beadie G., et al., "Optical Properties of a Bio-Inspired Gradient Refractive Index Polymer Lens," Optics Express, Jul. 21, 2008, vol. 16 (15), pp. 11540-11547.

(Continued)

*Primary Examiner* — John Bedtelyon
(74) *Attorney, Agent, or Firm* — Pequignot + Myers; Matthew A. Pequignot

(57) ABSTRACT

Disclosed is a polymeric waveguide for propagating light therein along width and length dimensions of the polymeric waveguide. The polymeric waveguide has a first curved surface on one side thereof and a second curved surface on an opposite second side thereof, and a refractive index spatially varying through a thickness thereof between the first curved surface and the second curved surface. The polymeric waveguide is curved in a cross-section comprising at least one of the width and length dimensions.

16 Claims, 11 Drawing Sheets

(56) References Cited

U.S. PATENT DOCUMENTS

2019/0072718 A1 3/2019 Ouderkirk

OTHER PUBLICATIONS

Bouchard S., et al., "GRIN Planar Waveguide Concentrator Used with a Single Axis Tracker," Optics Express, Mar. 10, 2014, vol. 22 (S2), 11 Pages.

Bouchard S., et al., "Planar Waveguide Concentrator Used with a Seasonal Tracker," Applied Optics, Oct. 1, 2012, vol. 51 (28), pp. 6848-6845.

Evans J., "Simple Forms for Equations of Rays in Gradient-Index Lenses," American Journal of Physics, Aug. 1990, vol. 58 (8), pp. 773-778.

Gleibner U., et al., "Optically and Rheologically Tailored Polymers for Applications in Integrated Optics," Sensors and Actuators A: Physical, 2016, vol. 241, pp. 224-230.

International Search Report and Written Opinion for International Application No. PCT/US2021/062672, dated Mar. 16, 2022, 10 pages.

Ji S., et al., "A Bio-Inspired Polymeric Gradient Refractive Index (GRIN) Human Eye Lens," Optics Express, Nov. 19, 2012, vol. 20 (24), pp. 26746-26754.

Jones K.M., et al., "A Calculus of Variations Demonstration: The Gradient Index Lens," American Journal of Physics, Dec. 1988, vol. 56 (12), 3 Pages.

Kerns J., et al., "Comparison of Irreversible Deformation and Yielding in Microlayers of Polycarbonate with Poly (methylmethacrylate) and Poly(styrene-co-acrylonitrile)," Journal of Applied Polymer Science, 2000, vol. 77 (7), pp. 1545-1557.

Kochan N.S., et al., "Mapping of Index of Refraction Profile for Polymer Gradient Index Optics Using Confocal Raman Spectroscopy," Optical Engineering, Nov. 2020, vol. 59 (11), 10 Pages, Retrieved from the Internet: URL: http://www.spiedigitallibrary.org/journals/Optical-Engineering.

Koike Y., et al., "High Bandwidth Graded-Index Polymer Optical Fiber," Journal of Lightwave Technology, Jul. 1995, vol. 13 (7), pp. 1475-1489.

Lippman D.H., et al., "Prescribed Irradiance Distributions With Freeform Gradient-Index Optics," Optics Express, Sep. 28, 2020, vol. 28 (20), pp. 29132-29147.

Makino K., et al., "Low Loss and High Bandwidth Polystyrene-Based Graded Index Optical Fiber," Journal of Lightwave Technology, Jul. 15, 2013, vol. 31 (14), pp. 2407-2412.

"Moore Research Group," The Institue of Optics [Online], Feb. 5, 2021, 1 page, Retrieved from the Internet: URL: http://www.hajim.rochester.edu/optics/sites/moore/downloads/Content.html.

"Moore Research Group," The Institue of Optics [Online], Feb. 5, 2021, 1 Page, Retrieved from the Internet: URL: http://www.hajim.rochester.edu/optics/sites/moore/index.html.

Mueller C., et al., "Breathable Polymer Films Produced by the Microlayer Coextrusion Process," Journal of Applied Polymer Science, 2000, vol. 78, pp. 816-828.

Ponting M., et al., "Polymar Nanostructures by Forced Assembly: Process, Structure and Properties," Macromolecular Symposia, 2010, vol. 294 (1), pp. 19-32.

Yang T., et al., "Efficient Representation of Freeform Gradient-Index Profiles for Non-Rotationally Symmetric Optical Design," Optics Express, May 11, 2020, vol. 28 (10), pp. 14788-14806.

International Preliminary Report on Patentability for International Application No. PCT/US2021/062672 dated Jun. 22, 2023, 9 pages.

* cited by examiner

CURVED GRADED-INDEX WAVEGUIDES AND METHODS OF MAKING THE SAME

REFERENCE TO RELATED APPLICATION

This application is a divisional of U.S. application Ser. No. 17/180,608 entitled "CURVED GRADED-INDEX WAVEGUIDES AND METHODS OF MAKING THE SAME", filed Feb. 19, 2021 which claims priority from U.S. Provisional Application No. 63/123,853, entitled "Curved Graded-Index Waveguides and Methods of Making the Same", filed on Dec. 10, 2020, and incorporated herein by reference in their entireties.

FIELD

The present disclosure relates generally to display devices. More particularly, the present disclosure relates to waveguides for head-mounted display devices such as augmented reality (AR) glasses.

BACKGROUND

An artificial reality system may generally include a near-eye display (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by seeing through a "combiner" component, which is a physical structure where display light and environmental light merge as one within the user's field of view. The combiner of a wearable heads-up display is typically transparent to environmental light but includes some light routing optic to direct the display light into the user's field of view.

Wearable heads-up displays may employ lightguides as transparent or translucent combiners. Lightguides typically consist of plates of a transparent material with a higher refractive index than the surrounding medium. Light input into the plate propagates along the length of the plate as long as the light continues to be incident at boundaries between the plate and the surrounding medium at an angle above the critical angle. Lightguides employ in-coupling and out-coupling elements to ensure that light follows a specific path along the waveguide and then exits the waveguide at a specific location in order to create an image visible to the user. The lightguides need to accurately convey the angular distribution of brightness of the in-coupled light beam to the user's eyes to prevent distortion of the displayed image.

SUMMARY

In accordance with an aspect of at least one embodiment there is provided a polymeric waveguide for propagating light therein along width and length dimensions of the polymeric waveguide, the polymeric waveguide having a first curved surface on one side thereof and a second curved surface on an opposite second side thereof, and the polymeric waveguide having a refractive index spatially varying through a thickness thereof between the first curved surface and the second curved surface, wherein the polymeric waveguide is curved in a cross-section comprising at least one of the width or length dimensions.

In an embodiment, the first curved surface is a concave surface, the second curved surface is a convex surface, and the refractive index decreases monotonically from the concave surface to the convex surface. In an embodiment, the first curved surface is a concave surface, the second curved surface is a convex surface, and a spatial profile of the refractive index, in going from the concave surface to the convex surface, is approximately parabolic. In an embodiment, the polymeric waveguide may have a curved mid-plane between the concave surface and convex surface, the refractive index decreasing between the curved mid-plane and each one of the concave surface and convex surface. In an embodiment the refractive index at the convex surface is lower than the refractive index at the concave surface. In an embodiment, the first and second curved surfaces may follow a simple curve. In an embodiment, the first and second curved surfaces may follow a compound curve. In some embodiments, the polymeric waveguide may include one or more of: a polyacrylate, a polyurethane, a polysilicone, a polyester, a polyolefin, a polyamide, a polycarbonate, copolymers thereof, and mixtures thereof. In an embodiment, the polymeric waveguide has a length along the length direction and a width along the width direction, and ratios of the length of the polymeric waveguide to the thickness of the polymeric waveguide and of the width of the polymeric waveguide to the thickness of the curved waveguide are both at least 10:1.

In accordance with an aspect of at least one embodiment there is provided a method of making a curved polymeric waveguide having a graded refractive index profile with a refractive index spatially varying through a thickness of the polymeric waveguide, the method comprising: forming a stacked structure comprising at least a layer of a first resin and a layer of a second resin, the first resin having a first refractive index when polymerized and the second resin having a second refractive index when polymerized that is different than the first refractive index; allowing the first resin and the second resin to diffuse into one another to form a composite resin structure in which a ratio of the second resin to the first resin in the composite resin varies in a thickness direction of the stacked structure; polymerizing the composite resin structure; and forming the polymerized composite resin structure into a pre-defined curved shape.

In an embodiment, forming the stacked structure includes: flowing the first resin into a first inlet of a plurality of inlets at a first end of a diffusion channel, the diffusion channel including an outlet at a second end opposite to the first end and separated from the plurality of inlets by a channel length; and flowing the second resin into a second inlet of the plurality of inlets, the flowing of the second resin being directed along a periphery of the first resin. In an embodiment, the first resin and the second resin diffuse into one another over the channel length between the plurality of inlets and the outlet. In some embodiments, the first resin and the second resin may be selected from a group including the following: a polyacrylate, a polyurethane, a polysilicone, a polyester, a polyolefin, a polyamide, a polycarbonate, copolymers thereof, and mixtures thereof. In an embodiment, the pre-defined curved shape includes at least one of substantially a portion of a sphere and substantially a portion of a cylinder. In an embodiment, the method further includes forming a layer of a third resin along a second periphery of the first resin that is opposite the first periphery, such that the first resin is disposed between the second resin and the first resin in the stacked structure. In an example, the third resin has a third refractive index, when polymerized, that is different than the first refractive index. In an example the first refractive index is higher than the third refractive index and the second refractive index is lower than the first refractive index and also lower than or equal to the third refractive index. In an embodiment, the variation of the ratio of the second resin to the first resin in the composite resin structure is selected to produce a predetermined refractive index profile in the curved polymeric waveguide, i.e., after the polymerized composite resin structure is formed into the pre-defined curved shape.

In accordance with an aspect of at least one embodiment there is provided a method of making a curved waveguide having a graded refractive index profile with a refractive index spatially varying through a thickness of the curved waveguide, the method comprising: providing a substrate in a deposition chamber; introducing a monomer-containing vapor into the deposition chamber and depositing material from the monomer-containing vapor onto a surface of the substrate over a period of time; controllably varying a ratio of an amount of a first monomer to an amount of a second monomer in the monomer-containing vapor over the period of time, such that the composition of the material that is deposited on the substrate changes over the period of time, wherein the first monomer has a first refractive index, when polymerized, and the second monomer has a second refractive index, when polymerized, the second refractive index being different than the first refractive index; and polymerizing the material deposited on the substrate.

In an embodiment, the surface of the substrate has a curved shape that includes at least one of substantially a portion of a sphere and substantially a portion of a cylinder. In an embodiment, the monomer-containing vapor comprises an initiator. In an embodiment, depositing material from the monomer-containing vapor onto the substrate further comprises initiating the initiator using at least one of an actinic source and a thermal source to provide energy for initiating the initiator, thereby polymerizing the deposited material. In an embodiment, the surface of the substrate has a convex shape. In an embodiment, the ratio of the amount of the first monomer to the amount of the second monomer in the monomer-containing vapor decreases over the period of time. In an embodiment, the first refractive index is greater than the second refractive index.

In accordance with an aspect of at least one embodiment there is provided a method of making a curved waveguide having a graded refractive index profile with a refractive index spatially varying through a thickness of the curved waveguide, the method comprising: fabricating a curved body comprising a polymer material having a single index of refraction, the curved body having a first major surface, a second major surface opposite the first major surface, and a thickness between the first major surface and the second major surface; protecting one of the first major surface and the second major surface; exposing the other one of the first major surface and the second major surface to a solution comprising an initiator and a monomer that has an index of refraction, when polymerized, that is different than the single index of refraction of the polymer material; allowing the monomer to diffuse into the polymeric material, such that a concentration gradient of the monomer in the polymer material is formed within at least part of the thickness between the first major surface and the second major surface; and polymerizing the diffused monomer within the polymeric material.

In accordance with an aspect of at least one embodiment there is provided a method of making a curved waveguide having a graded refractive index profile with a refractive index spatially varying through a thickness of the curved waveguide, the method comprising: providing a curved substrate; applying a first dip-coated layer of a first material having a first refractive index when polymerized onto the substrate; polymerizing the layer of the first material; applying a second dip-coated layer of a second material having a second refractive index when polymerized onto the layer of the first material, the second refractive index different than the first refractive index; polymerizing the layer of the second material.

BRIEF DESCRIPTION OF THE DRAWINGS

The instant disclosure will now be described by way of example only, and with reference to the attached drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

As used herein, the term "resin" is defined as a solid or viscous flowable substance, typically of synthetic origin but optionally of plant origin, that is convertible into polymers. A resin may include any or all of the following constituents: monomers, oligomers, initiators, plasticizers, solvents, other suitable additives. The term "simple curve" denotes a curve is one that can be easily formed, e.g. by bending a flat plate or a similar simple operation. An example is a cylindrical meniscus shape. The term "compound curve" is taken to mean, for example, a spherical or an aspherical meniscus shape.

Exemplary embodiments provide a curved polymeric waveguide for use in various visual display systems, e.g. wearable heads-up display systems, such as for instance augmented reality (AR) or virtual reality (VR) glasses. The use of curved waveguides in face-worn devices can improve their social acceptability by reducing unusual or distracting reflections and by simulating the more familiar look of ophthalmic lenses. One disadvantage of curved waveguides is that wavefront error (i.e., loss of collimation) builds up along the direction of light traveling by total internal reflection, even for relatively modest waveguide curvatures. One solution to correct the beam distortion is to form the curved waveguide with a spatially varying refractive index profile across a thickness between the curved major surfaces, as described in more detail below.

Curved Graded-Index (GRIN) Waveguide Structure

Figure 1:
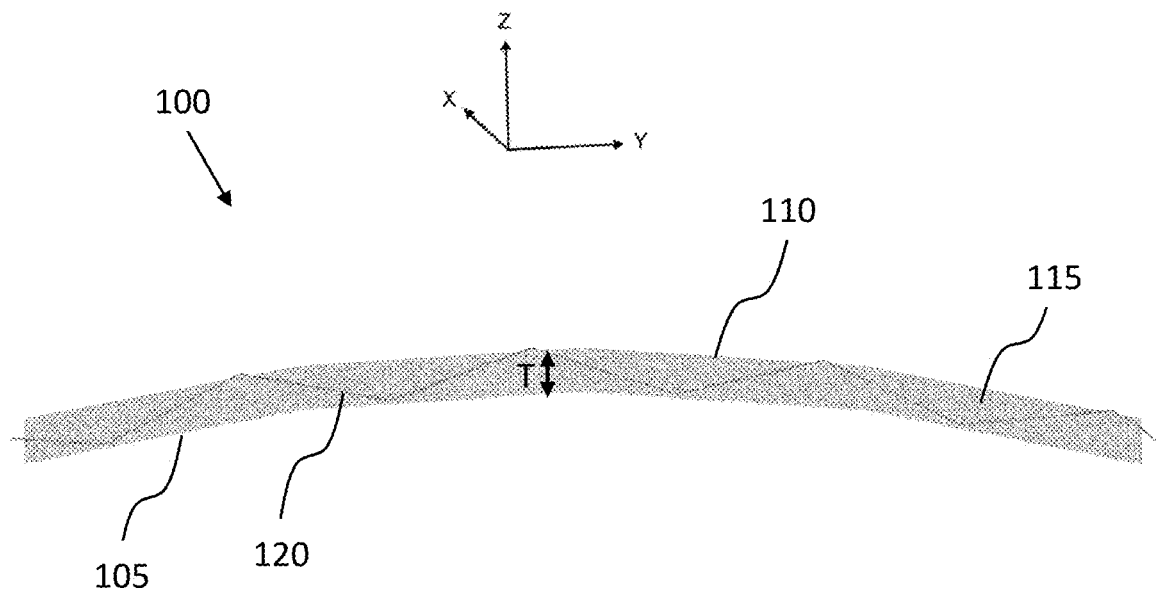
FIG. 1 is a cross-sectional view showing a curved waveguide structure having a graded refractive index profile.

FIG. 1 is a cross-sectional view showing an example curved waveguide structure 100 having a graded refractive index (GRIN) profile. The curved GRIN waveguide structure 100 has a first major surface 105 and a second major surface 110. In FIG. 1, the first major surface 105 is a concave (eye-facing) surface, and the second major surface 110 is a convex (world-facing) surface. The curved waveguide structure 100 has a thickness T defined between the first major surface 105 and the second major surface 110, a length defined along a length dimension (e.g., the y-direction in FIG. 1) and a width defined along a width dimension (e.g., the x-direction in FIG. 1). As is shown in FIG. 1, the curved waveguide structure 100 is curved in a cross-section comprising at least one of the width and length dimensions. In some embodiments, the curved GRIN waveguide structure 100 has a shape that follows a simple curve in the YZ-plane (as illustrated in FIG. 1) and/or in the XZ-plane (not illustrated). In some embodiments, the curved GRIN waveguide structure 100 has a shape that follows a compound curve in the YZ-plane and/or in the XZ-plane.

Referring still to FIG. 1, a spatial profile 115 of the refractive index between the first major surface 105 and the second major surface 110 at least partially compensates for a curvature of the curved GRIN waveguide 100, such that inputted light 120 propagating through the curved waveguide structure 100 carries an image in angular domain substantially without distortions introduced by the waveguide curvature, i.e., by the waveguide structure 100 not being a plano-parallel plate. The refractive index variation across the thickness T is selected to facilitate bending the rays of the inputted light 120 that lessens the image distortions due to curved first 105 and second 115 major surfaces. The index of refraction may remain substantially constant in the orthogonal directions (x-direction and y-direction), along a curved surface running parallel to the curved surfaces 105 and 110. In some embodiments, the thickness T remains constant in x- and y-directions.

In the example that is shown in FIG. 1, the refractive index varies between the first major surface 105 and the second major surface 110. The refractive index may vary monotonically or non-monotonically and may be described by a graded index (GRIN) profile. The refractive index may decrease in going from the concave first surface 105 to the convex second surface 115. In some embodiments, a spatial profile of the refractive index in going from the concave surface (first major surface 105) to the convex surface (second major surface 110) is approximately parabolic, including an asymmetric parabola. In some embodiments, the refractive index closest to the concave (first major surface 105) is at least 0.05; at least 0.1; at least 0.15; at least 0.2; or at least 0.3 greater than the refractive index closest to the convex (second major surface 110). In some embodiments, a spatial variation of the refractive index is at least $0.001/\mu m$; at least $0.002/\mu m$; at least $0.005/\mu m$; or at least $0.01/\mu m$. In some embodiments, the ratio of a length of the waveguide 100 along the length dimension (e.g., y-direction in FIG. 1) to the thickness T and the ratio of a width of the waveguide 100 along the width dimension (e.g., x-direction in FIG. 1) to the thickness T are both at least 10:1. In some embodiments, a radius of curvature of the curved GRIN waveguide 100 is no more than 2 meters; 1 meter; 0.5 meters; 0.25 meters; 0.1 meters; or 0.05 meters.

In some embodiments, the curved GRIN waveguide 100 is fabricated from a polyacrylate, a polyurethane, a polysilicone, a polyester, a polyolefin, a polyamide, a polycarbonate, other optically clear polymers, copolymers thereof, or mixtures of one or more polymers or copolymers, or layers of different polymers, copolymers, and mixtures thereof.

In some embodiments, the polydispersity index (Mw/Mn) is less than 10, or less than 5, or less than 2. The polydispersity index is determined by the ratio of the average molecular weight by weight (Mw) to the average molecular weight by number (Mn). In an example, molecular weight and number averages are determined by size exclusion chromatography. In some embodiments, the polymers are crosslinked with the number of cross-links per molecule of monomer being about 0.001, 0.01, or 0.1 or greater.

Other features of the curved GRIN waveguide 100 are described in more detail with reference to the different systems and methods for fabricating such components, which will be considered further below.

Figure 2:
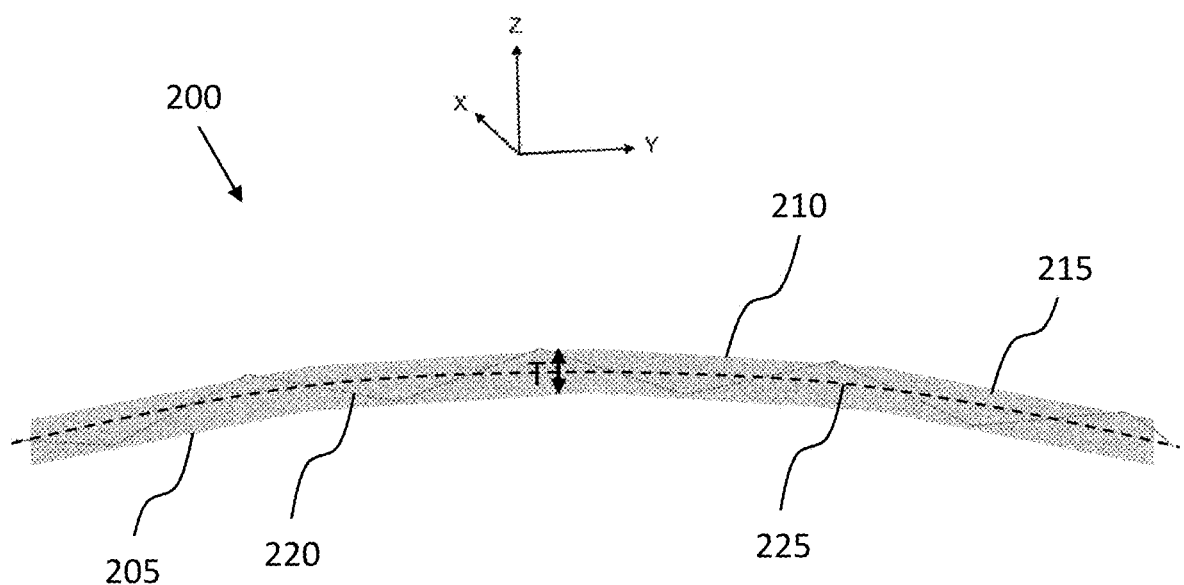
FIG. 2 is a cross-sectional view showing another curved waveguide structure having a graded refractive index profile.

FIG. 2 is a cross-sectional view showing the major features of a curved waveguide structure 200 having a central layer 225 between the first major surface 205 and the second major surface 210. The curved GRIN waveguide structure 200 has a first major surface 205 and a second major surface 210. In FIG. 2 the first major surface 205 is a concave (eye-facing) surface and the second major surface 210 is a convex (world-facing) surface. The curved waveguide structure 200 has a thickness T defined between the first major surface 205 and the second major surface 210, a length defined along a length dimension (e.g., the y-direction in FIG. 2), and a width defined along a width dimension (e.g., the x-direction in FIG. 2). As is shown in FIG. 2, the curved waveguide structure 200 is curved in a cross-section comprising at least one of the width and length dimensions. In some embodiments, the curved GRIN waveguide structure 200 has a shape that follows a simple curve in the YZ-plane (as illustrated in FIG. 2) and/or in the XZ-plane (not illustrated). In some embodiments, the curved GRIN waveguide 200 has a shape that follows a compound curve in the YZ-plane and/or in the XZ-plane.

Referring still to FIG. 2, a spatial profile 215 of the refractive index between the first major surface 205 and the second major surface 210 compensates for a curvature of the curved GRIN waveguide 200, such that inputted light 220 propagating through the waveguide 200 carries an image in angular domain without distortions introduced by the waveguide curvature, i.e., by the waveguide structure 200 not being a plano-parallel plate. The refractive index is substantially constant in the orthogonal directions (x-direction and y-direction) along a surface running parallel to the curved surfaces 205 and 210.

The central layer 225 of the curved GRIN waveguide 200 may be disposed midway between the first major surface 205 and the second major surface 210, and the refractive index of the central layer 225 may be higher than the refractive index adjacent to the first major surface 205 and is higher than the refractive index adjacent to the second major surface 210. The graded refractive index profile may be asymmetric or symmetric about the central layer 225. In some embodiments, the refractive index at the central layer 225 is at least 0.01; at least 0.02; at least 0.05; or at least 0.10 higher than a refractive index adjacent to the first major surface 205 and/or the second major surface 210. In some embodiments, the central layer 225 may be closer to surface 205 than surface 210.

In some embodiments, the ratio of a length of the waveguide 200 along the length dimension (e.g., y-direction in FIG. 2) to the thickness T and the ratio of the width of the waveguide 200 along the width dimension (e.g., x-direction in FIG. 2) to the thickness T are both at least 10:1. In some embodiments, a radius of curvature of the curved GRIN waveguide 200 is no more than 2 meters; 1 meter; 0.5 meters; 0.25 meters; 0.1 meters; or 0.05 meters.

In some embodiments, the curved GRIN waveguide 200 is fabricated from a polyacrylate, a polyurethane, a polysilicone, a polyester, a polyolefin, a polyamide, a polycarbonate, other optically clear polymers, copolymers thereof, or mixtures of one or more polymers or copolymers, or layers of different polymers, copolymers, and mixtures thereof.

In some embodiments, the polydispersity index (Mw/Mn) is less than 10 (or less than 5 or less than 2). The polydispersity index determined by the ratio of the average molecular weight by weight (Mw) to the average molecular weight by number (Mn). In an example, molecular weight and number averages are determined by size exclusion chromatography.

Other features of the curved GRIN waveguide 200 are described in more detail with reference to the different systems and methods for fabricating such components, which will be considered further below.

Fabrication of Curved GRIN Waveguides

Fabrication of curved GRIN waveguides that are suitable for use displays, e.g. in wearable heads-up display systems, such as for instance AR or VR glasses, can be divided into two broad categories: 1) fabrication of an intermediate waveguide structure followed by a subsequent shaping step to obtain a desired final curved form, and 2) direct fabrication of a waveguide structure having a desired final curved form. In general, the subsequent shaping of an intermediate waveguide structure may affect the refractive index gradient profile in the final waveguide structure, e.g., due to stretching and/or compression of the waveguide material. In some embodiments, the composition of the intermediate waveguide structure is fabricated to produce a desired refractive index profile after the intermediate waveguide structure is shaped into the final desired curved form.

The fabrication methods described below are capable of producing curved GRIN waveguide structures that exhibit a plurality of desirable characteristics. For instance, as a non-limiting example, the fabrication methods may produce curved GRIN waveguide structures having major curved surfaces that are parallel to one another and that are substantially free of surface imperfections or irregularities. As another non-limiting example, the fabrication methods may produce curved waveguide structures in which the refractive index profile varies, either continuously or discontinuously, along a direction that is normal to the major curved surfaces, and in which the refractive index is substantially uniform along curved planes running parallel to the major curved surfaces.

Example 1

Resin Co-Flow

Figure 3:
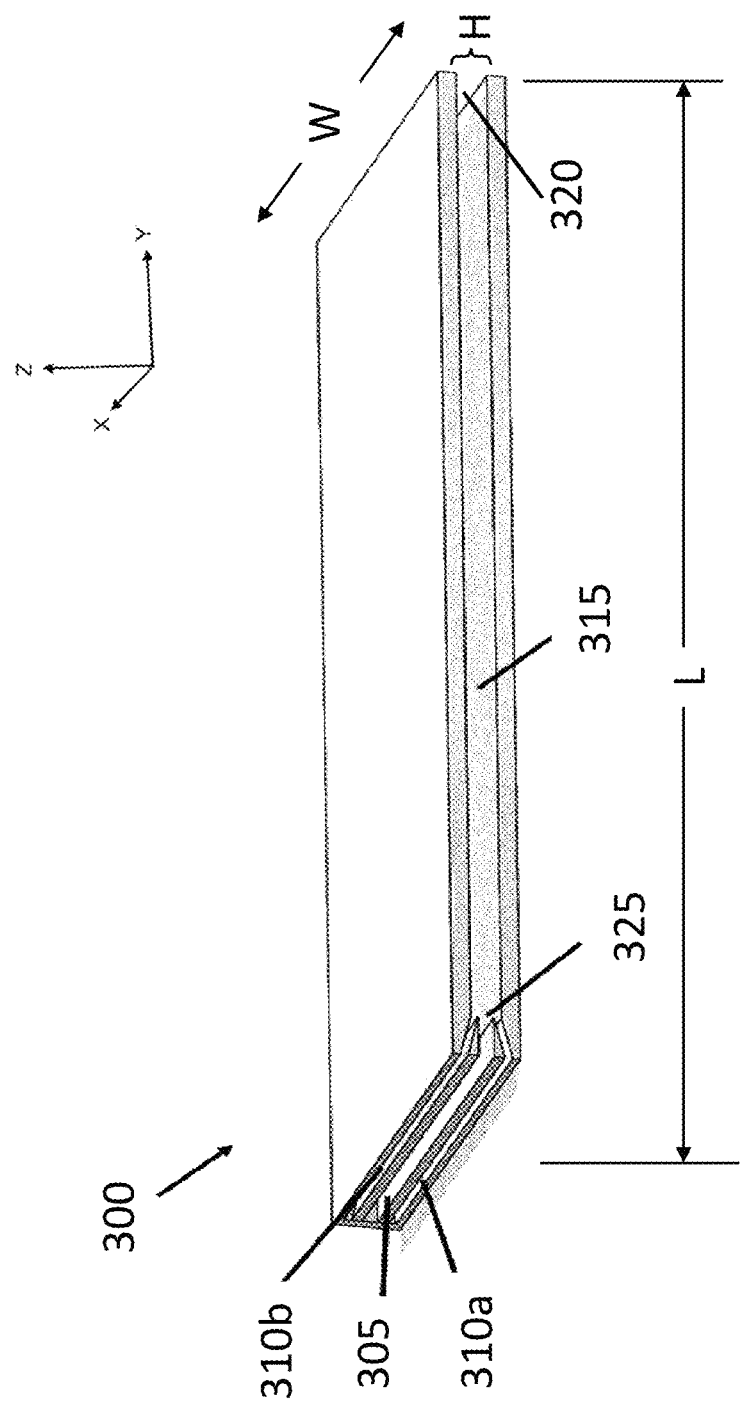
FIG. 3 is a cross-sectional view showing a resin flow system for fabricating a curved waveguide having a graded refractive index profile.

Referring now to FIG. 3, shown is an isometric view of a resin flow system 300 for use in a method of making curved polymeric waveguides having a GRIN profile with a refractive index spatially varying through a thickness of the waveguide, in accordance with an embodiment. The resin flow system 300 includes a plurality of inlets disposed at a first end of the resin flow system 300, including a central inlet 305, an outer inlet 310a, and an outer inlet 310b. An outlet 320 is disposed at a second end of the resin flow system 300. A channel 315 extends between the first end and the second end for directing a flow of resin material from the inlets 305, 310a, 310b to the outlet 320. As shown in FIG. 3, the channel 315 has a width W (in the x-direction), a height H (in the z-direction), and a length L (in the y-direction). In one example, the width W is at least 2 times the height H. In another example, the width W is at least 5 times the height H. In yet another example, the width W is at least 10 times the height H.

The central inlet 305 is in fluid communication with a (not illustrated) source of a first resin (e.g., methyl methacrylate), and the outer inlets 310a and 310b are in fluid communication with a not illustrated source of a second resin (e.g., hexafluoroisopropyl acrylate). During use, the first resin is introduced into the channel 315 via the first inlet 305 and the second resin is introduced into the channel 315 via the outer inlets 310a and 310b. The inlets 305, 310a and 310b are configured to bring the first and second resins into contact with each other in region 325, thereby creating a layered resin flow within the channel 315. The first and second resins may partially diffuse or be mixed into each other as they flow along the length L of channel 315, thereby producing a composite resin that exits the system 300 via the outlet 320.

Figure 4:
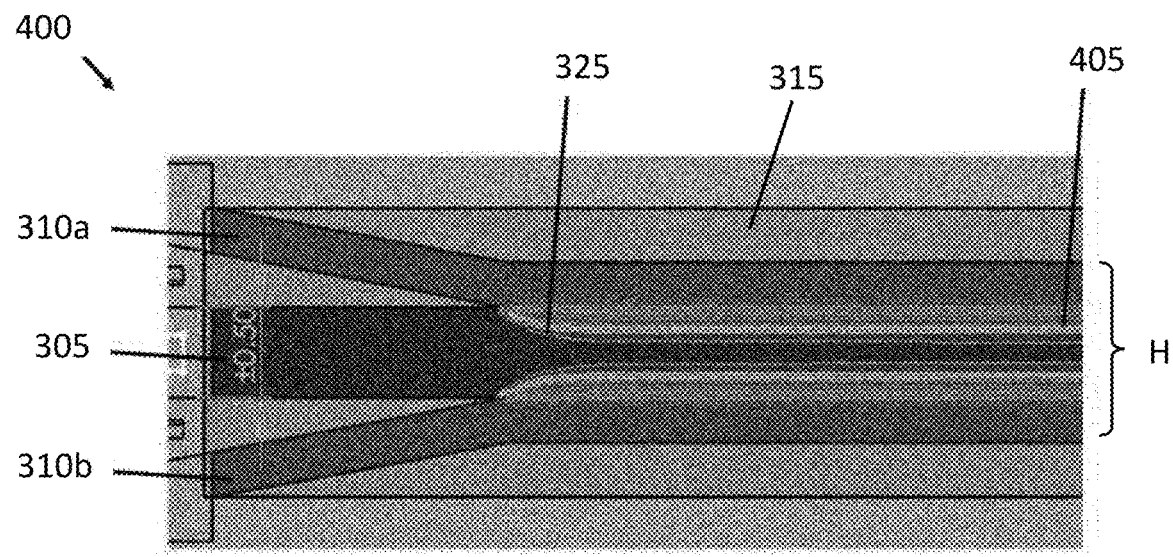
FIG. 4 is a simplified illustration showing the diffusion of first and second resins into one another at a first-end portion of the resin flow system of FIG. 3.

FIG. 4 is a simplified illustration showing the diffusion of first and second resins into one another at a first-end portion 400 of the resin flow system 300. The first resin is introduced via the central inlet 305 at approximately the mid-height of the channel 315. The second resin is introduced via the outer inlets 310a and 310b and comes into contact with the first resin in the region 325, filling the space between the walls of the channel 315 and the layer of first resin. The introduction of additional resin via the inlets 305, 310a and 310b causes flow to occur within the channel 315. As is shown in FIG. 4, the first resin and the second resin begin diffusing into each other while flowing between region 325 and region 405.

Figure 5:
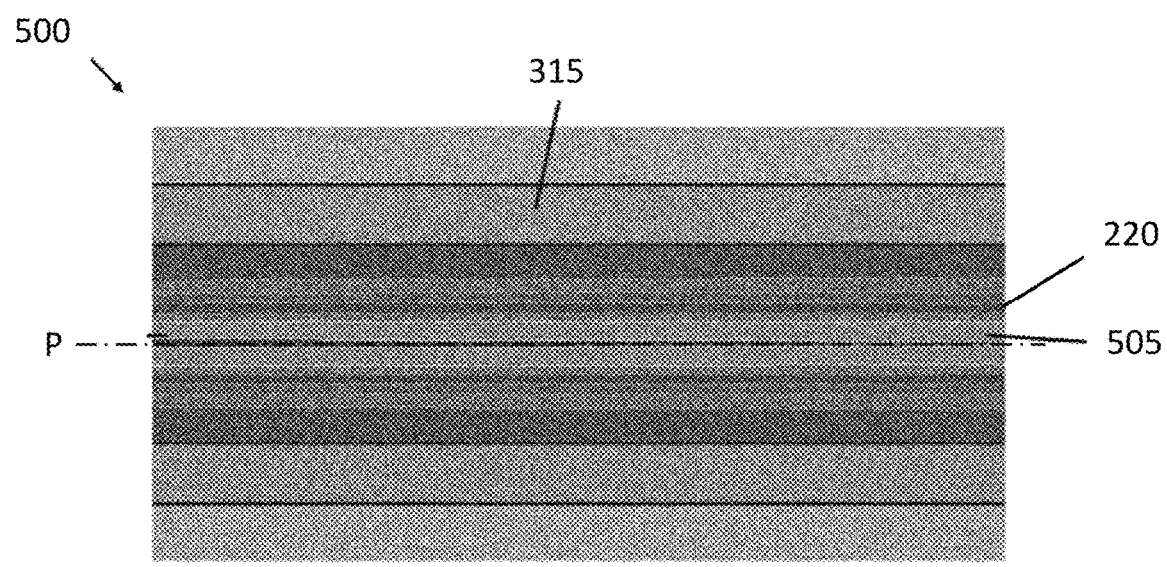
FIG. 5 is a simplified illustration showing the further diffusion of first and second resins into one another within a second-end portion of the system of FIG. 3.

FIG. 5 is a simplified illustration showing the further diffusion of first and second resins into one another within a second-end portion 500 of the resin flow system 300. More particularly, FIG. 5 shows the diffusion of the first and second resins into one another downstream from the region 405 in FIG. 4. Since the second resin is introduced as separate flows along opposite sides of the first resin, diffusion occurs more-or-less symmetrically about a plane P at the mid-height of the channel 315. The compositions of the first and second resins, including additives such as initiators, solvents, etc., flow rate/residence time of the first and second resins in the channel 315, dimensions of the channel 315, heating/irradiation of the first and second resins, etc., influence the diffusion of the first and second resins into one another to produce a desired composite resin at region 505 proximate the outlet 320.

The composite resin passes out of the channel 315 via the outlet 320 and is deposited onto a substrate (discussed in more detail with reference to FIG. 8). Diffusion of the first and second resins into one another continues up to the point where each of the resins is sufficiently polymerized. The combination of diffusion occurring in the channel 315 and after being deposited onto the substrate creates the desired refractive index profile in the curved GRIN waveguide structure. If a major portion of a desired diffusion occurs in the channel 315, then preferably the channel 315 is no wider than about 100 cm. Alternatively, the channel 315 is no wider than about 10 cm. Further alternatively, the channel 315 is no wider than about 1 cm. The average flow rates within the channel 315 may be less than 100 cm/min. Alternatively, the average flow rates within the channel 315 may be less than 20 cm/min. Further alternatively, the average flow rates within the channel 315 may be less than 10 cm/min.

In some embodiments, the composite resin when polymerized may have a refractive index profile that has a constant or spatially varying gradient in going from one outer surface to the other. In some embodiments, the composite resin has a mirrored symmetrical profile. The refractive index of the composite resin when polymerized may have, by way of a specific and non-limiting example, a refractive index varying from 1.55 on one side to 1.5 on the other. Of course, different applications may require different refractive indices.

Figure 6:
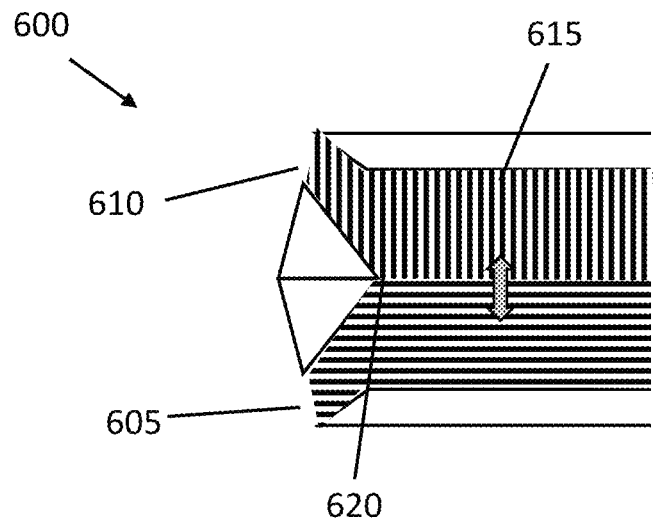
FIG. 6 is longitudinal cross-sectional view of an inlet region of a resin flow system having an alternate configuration.

Referring now to FIG. 6, shown is longitudinal cross-sectional view of an inlet region of a resin flow system 600 having an alternate configuration. The system 600 includes a first inlet 605 that is in fluid communication with a not illustrated source of a first resin and a second inlet 610 that is in fluid communication with a not illustrated source of a second resin. As shown in FIG. 6, the first inlet 605 introduces the first resin into the channel 615 and the second inlet 610 introduces the second resin into the channel 615, such that the first resin and the second resin come into contact with one another in region 620 and flow together along the length of the channel 615 toward a not illustrated outlet. The first resin and the second resin diffuse into one another, indicated by the double-headed block-arrow in FIG. 6, while flowing along the length of channel 615 toward the outlet, to form a composite resin that when polymerized has a profile with a plurality of index of refractions in at least one dimension. The composite resin exits the system 600 via the not illustrated outlet and is deposited onto a substrate, as described above with reference to FIG. 5.

Figure 7:
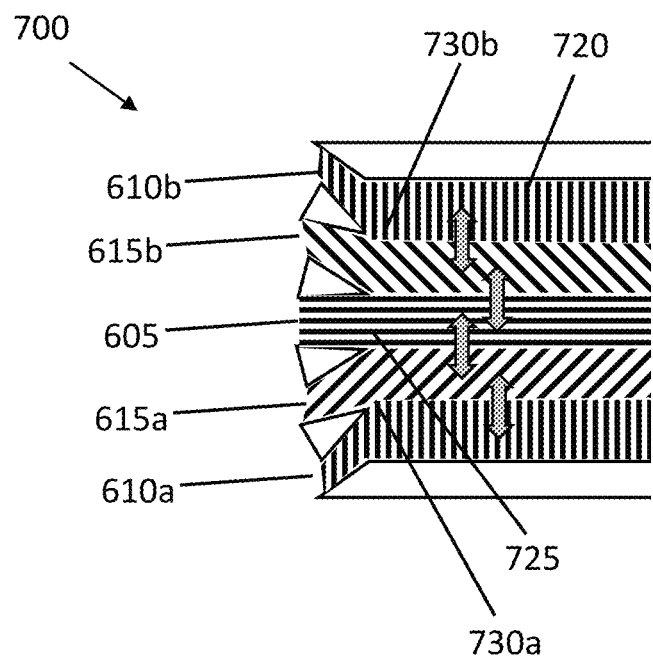
FIG. 7 is longitudinal cross-sectional view of an inlet region of a resin flow system having another alternate configuration.

Referring now to FIG. 7, shown is longitudinal cross-sectional view of an inlet region of a resin flow system 700 having another alternate configuration. The system 700 includes a central inlet 705 in fluid communication with a not illustrated source of a first resin material. In addition, the system 700 includes outer inlets 710a and 710b that are in fluid communication with a not illustrated source of a second resin material. Further, the system 700 includes intermediate inlets 715a and 715b that are in fluid communication with a not illustrated source of a third resin material. As shown in FIG. 7, the central inlet 705 introduces the first resin at approximately the mid-height of the channel 720, the intermediate inlets 715a and 715b introduce the third resin into the channel 720 such that the first resin and third resin come into contact with one another in region 725, and the outer inlets 710a and 710b introduce the second resin into the channel 720 such that the second resin and the third resin come into contact with one another in regions 730a and 730b. The first, second and third resins flow together along the length of the channel 720 toward a not illustrated outlet. The first resin and the third resin diffuse into one another and the second resin and the third resin also diffuse into one another, as indicated by the double-headed block-arrows in FIG. 7, while flowing along the length of channel 620 toward the outlet, to form a composite resin that when polymerized has a profile with a plurality of index of refractions in at least one dimension. The composite resin exits the system 700 via the not illustrated outlet and is deposited onto a substrate, as described above with reference to FIG. 5.

In some embodiments, the resins entering the resin flow system 700 may be a set of resins with a range of refractive indices. For example, the first resin material may have a high refractive index when polymerized, the second resin material may have a low refractive index when polymerized, and the third resin material may be a mixture of the first resin material and the second resin material. Alternatively, the third resin material may be different resin material having a refractive index when polymerized that is intermediate the refractive index of the first resin material when polymerized and the refractive index of the second resin material when polymerized.

By way of a specific and non-limiting example, high index resins used in the systems described above may have a refractive index of at least 1.55 when polymerized and low index resins may have a refractive index of at most 1.5 when polymerized. Alternatively, resins having different indices of refraction may be used as desired for a particular application. The desired refractive index profile of the optical waveguide may be achieved by controlling process parameters, including, but not restricted to, flow rates, mixing of resins provided to the resin flow system, time allowed for diffusion before polymerization, and a gradient of temperature across the resin flow system etc.

Figure 8:
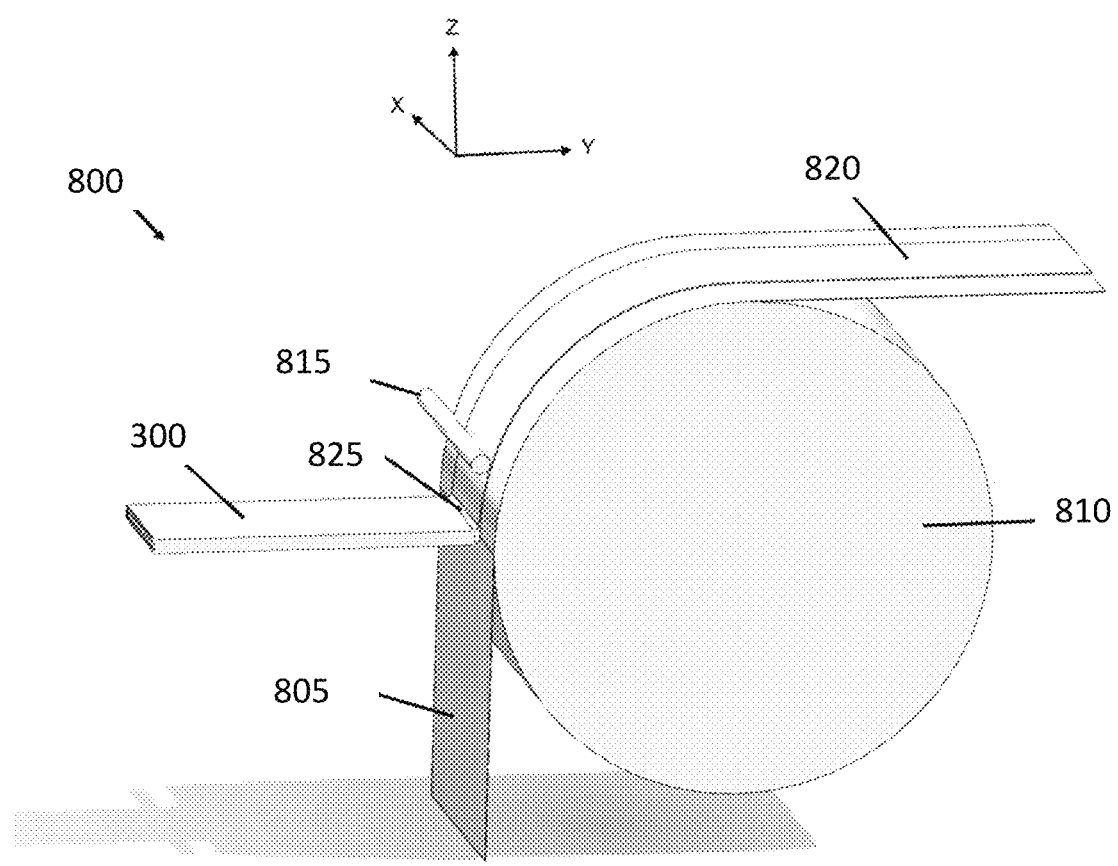
FIG. 8 is an isometric view showing the fabrication of a waveguide sheet onto a liner for subsequent forming into a desired shape.

FIG. 8 illustrates an isometric view of a system 800 for manufacturing an optical waveguide with graded refractive index profile. The system 800 includes a resin flow system 300, or optionally one of the resin flow systems 600 or 700, a substrate 805, a rotating assembly 810, and an irradiation system 815. The substrate 805 can be e.g., a thin layer of plastic sheet. Suitable substrates include, but are not limited to, polyethylene terephthalate, polyethylene, and polyimide. Substrate thickness is preferably between 10 and 100 microns. The rotating assembly 810 performs a rotation of the substrate 805 about a first dimension (e.g., rotate around the x-dimension) such that the substrate 805 moves along a second dimension and a third dimension (e.g., y-dimension and z-dimension). The irradiation system 815 is an illumination system that performs a polymerization of at least a portion of a mixture of one or more resins. Movement of the substrate 805 may be accomplished by other means as well, including sliding the substrate 805 over the outlet of the resin flow system 300, or using a translation stage. Alternately, the resin may be allowed to flow out of the resin flow system 300 forming a freely suspended resin stream, the resins may then be polymerized to form a waveguide.

In the embodiment of FIG. 8, the resin flow system 300 applies one or more resins 820, e.g. the composite resin described supra with reference to FIGS. 3-5, to the substrate 805 supported by the rotating assembly 810. The resins 820 flow from the resin flow system 300 to the substrate 805 forming a region 825, where there is little mixing in the transition. In some configurations, the irradiation system 815 polymerizes the resins through an actinic radiation (e.g., blue light, UV, or electron beams), thermal initiation, or a combination of both. The two or more resins may use different initiation approaches. For example, a thermal initiator may be used in the resins near the center of the resin flow system 300, and a photoinitiator may be used in the resins near or against the walls of the resin flow system 300. The resins may be partially polymerized while traveling through the resin flow system 300, and polymerization may be completed after the partially polymerized resins exit the outlet 320 of the resin flow system 300.

Figure 9:
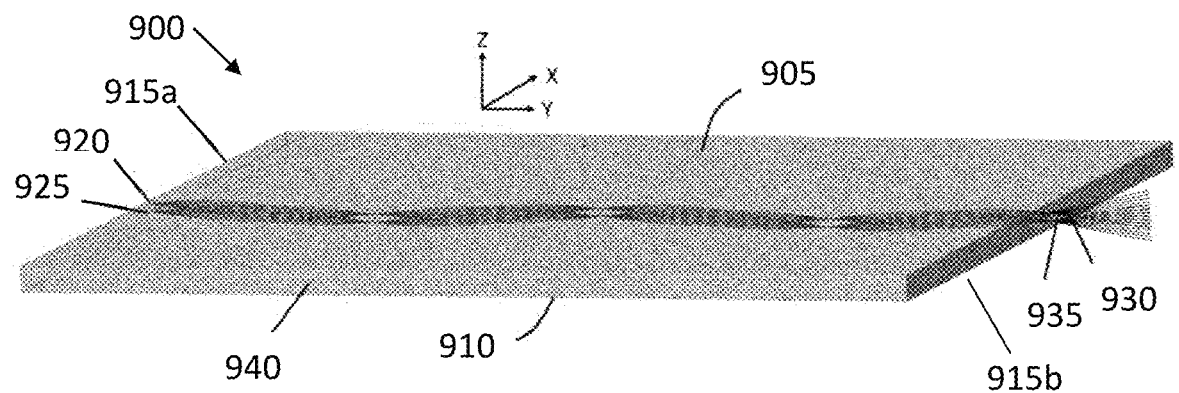
FIG. 9 is an isometric view of a planar waveguide structure having a spatially varying refractive index in the z-direction.
Figure 10:
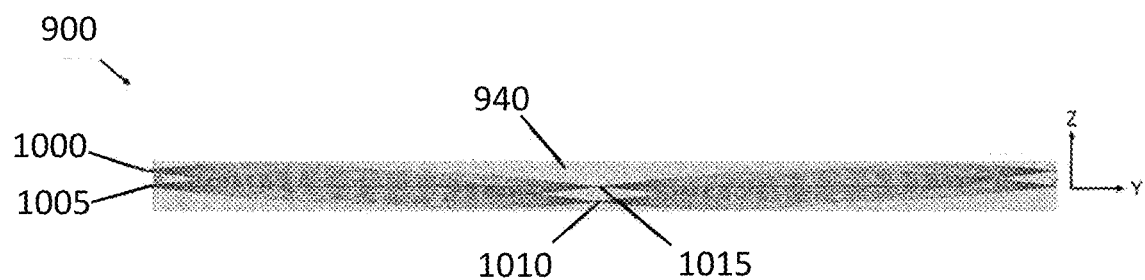
FIG. 10 is a cross-sectional view of the planar waveguide structure of FIG. 9.

The composite resins may initially be formed into a flat or planar intermediate waveguide structure. FIGS. 9 and 10 show an isometric view and a cross-sectional view, respectively, of a flat or planar intermediate waveguide structure 900 with graded index profile, fabricated using the system 800 of FIG. 8. The intermediate waveguide structure 900 includes a front surface 905, a back surface 910, a face 915a, and a face 915b. As shown in FIG. 9, face 915a receives the ray 920 and the ray 925 face 915b and transmits the ray 930 and the ray 935 from the face 915b.

As shown in FIG. 9, the intermediate waveguide structure 900 has a substantially parabolic index profile 940 along the z-dimension, and a fixed value of index of refraction along the x-dimension and y-dimension. In some configurations, there may be some variation of index of refraction along the x-dimension and y-dimension. For example, the index of refraction of the intermediate waveguide structure 900 may be modulated or formed into a desired profile, depending on the application. In general, the index of refraction of the intermediate waveguide structure 900 in both the x-dimension and the y-dimension may be constant for planes parallel to the front surface 905, and the back surface 910. In one example, the ratio of the length of the intermediate waveguide structure 900 along the y-axis to the thickness along the z-axis, and the length of the intermediate waveguide structure 900 along the x-axis to the thickness along the z-axis are both at least 10:1. The intermediate waveguide structure 900 is made of polymers including, but not restricted to, polyacrylate, polyurethane, polysilicone, polyester, polyolefin, polyamide, polycarbonate, any other optically transparent polymers and/or copolymers, and some combination thereof. In one example, the intermediate waveguide structure 900 is made of a first resin and a second resin associated with a polydispersity index of at most 10.

In some embodiments, the intermediate waveguide structure 900 is a transparent, planar waveguide having a graded index profile along the z-dimension with a variation of less than 0.1/µm, and a constant index of refraction along the x-dimension and the y-dimension. The intermediate waveguide structure 900 includes a central layer (not shown) located at a midpoint between the front surface 905 and the back surface 910, where the index of refraction of the central layer is at least 0.01 higher than the index of refraction of areas adjacent to the front surface 905 and the back surface 910.

Referring now to FIG. 10, as shown in cross-sectional view the intermediate waveguide structure 900 has a graded index of refraction 940 in the z-dimension. The ray 1000 and the ray 1005 propagate through the intermediate waveguide structure 900, and are focused at the focal point 1010 and the focal point 1015 as the rays 1000 and 1005 propagate through the intermediate waveguide structure 900.

Figure 11:
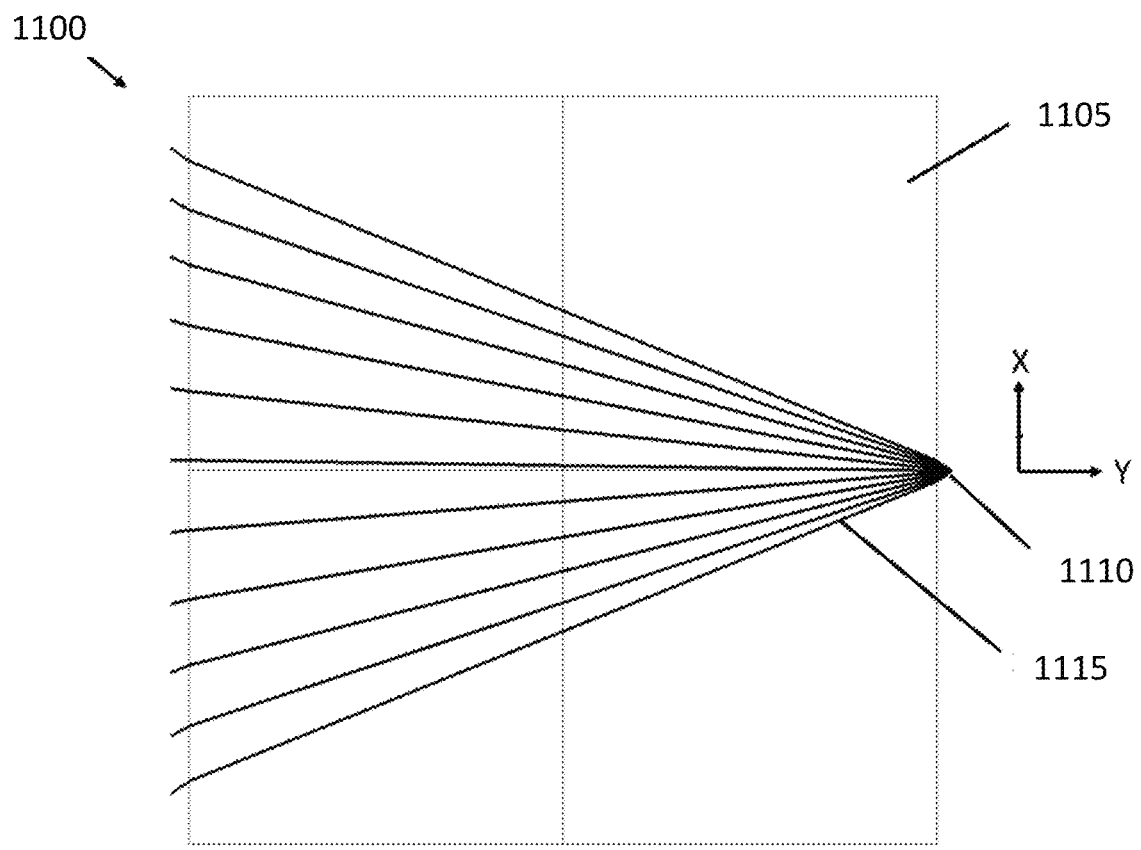
FIG. 11 shows ray bundle propagation in a 1-dimension graded index waveguide device.

As shown in FIG. 11, in a top view of a 1-dimension graded index waveguide device 1100 with the waveguide 1105 viewed in the XY plane, ray bundle 1110 enters the waveguide 1105 and rays propagating in the waveguide from this perspective (in going from right to left) are not refracted within the waveguide, as shown by example ray 1115. The ray bundle 1110 remains guided in Z-direction, that is, in the direction of thickness of the waveguide 1105, while propagating freely in XY plane.

Subsequent forming of the intermediate waveguide structure 900 may then be performed to obtain a waveguide device having a desired, curved form. For instance, the polymerized resins of the intermediate waveguide structure 900, produced using the system shown in FIG. 8, may be conformed to a curved mold or otherwise suitably processed to have a final desired curved form. For instance, the polymerized resins can be conformed to a cylinder or to a sphere, etc. Optionally the layers of the composite resins are disposed for their optical properties when subsequently formed into their final desired curved form. In various embodiments, the graded index profile of the curved waveguide device may be described by a monotonic function, a symmetric or asymmetric parabolic function, a symmetric or asymmetric Gaussian function, etc. The composite resins can be partially polymerized or fully polymerized and then subsequently formed into a desired curved shape, including at least a shape that follows a simple curve or a shape that follows a compound curve. By way of a specific and non-limiting example, the curved waveguides can be shaped similarly to the curved GRIN waveguide 100 shown above in FIG. 1 or to the curved GRIN waveguide 200 shown above in FIG. 2, i.e., such that the curved GRIN waveguide 100 or 200 is curved in a cross-section comprising at least one of the width or length dimensions of the curved GRIN waveguide 100 or 200, respectively.

Figure 12:
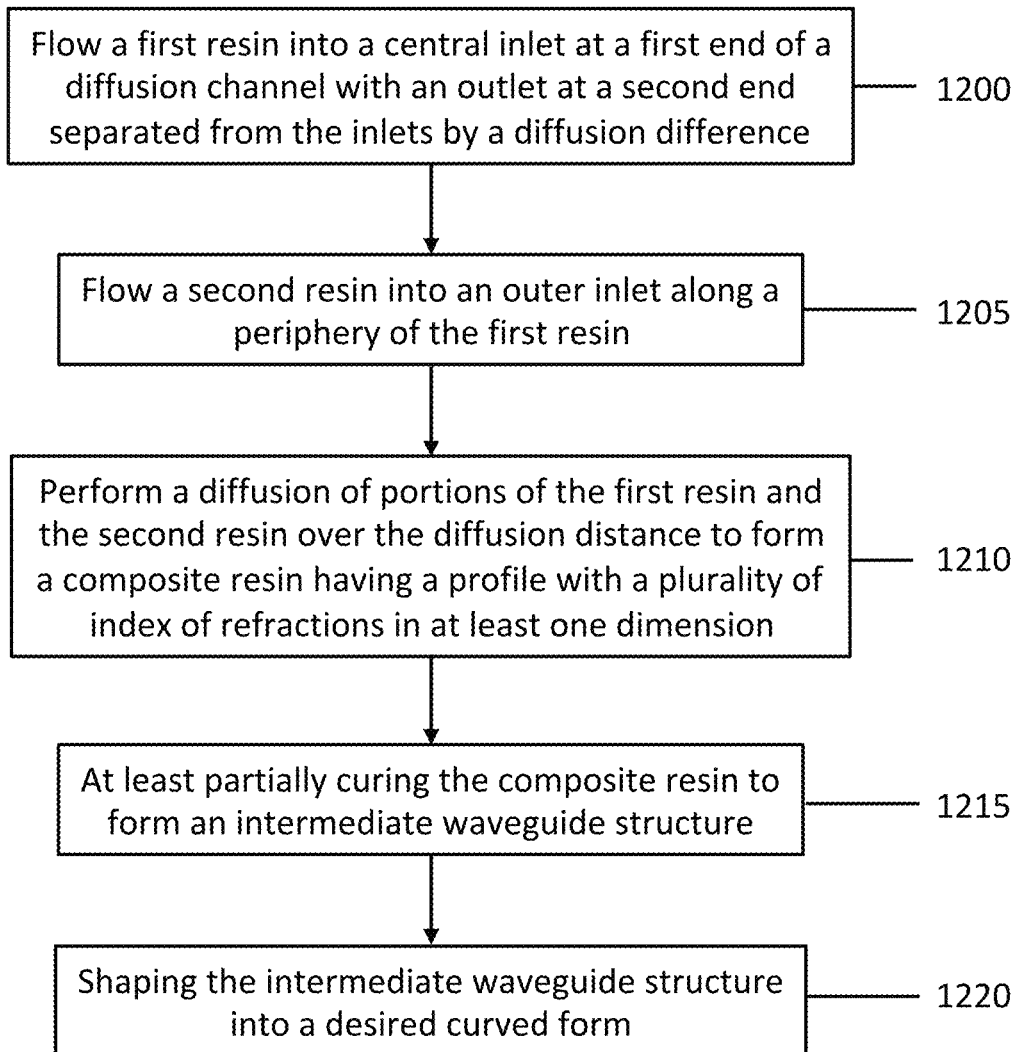
FIG. 12 is a simplified flow diagram for a method of making a curved polymeric waveguide having a graded refractive index profile with a refractive index spatially varying through a thickness of the polymeric waveguide.

Referring now to FIG. 12, shown is a simplified flow diagram of a method of making a curved polymeric waveguide having a graded refractive index profile with a refractive index spatially varying through a thickness of the polymeric waveguide. At step 1200 a first resin is flowed into a central inlet at a first end of a diffusion channel with an outlet at a second end separated from the inlets by a diffusion difference. At step 1205 a second resin is flowed into an outer inlet along a periphery of the first resin. At 1210 a diffusion of portions of the first resin and portions of the second resin is performed over the diffusion distance to form a composite resin having a profile with a plurality of index of refractions in at least one dimension. At 1215 the composite resin is at least partially cured to form an intermediate waveguide structure. At 1220 the intermediate waveguide structure is shaped into a desired curved form. For instance, the intermediate waveguide structure is conformed to a cylindrical mold or is conformed to a spherical mold. Optionally, the intermediate waveguide structure is heated prior to being shaped into the desired curved form.

Example 2

Chemical Vapor Deposition (CVD)

Figure 13:
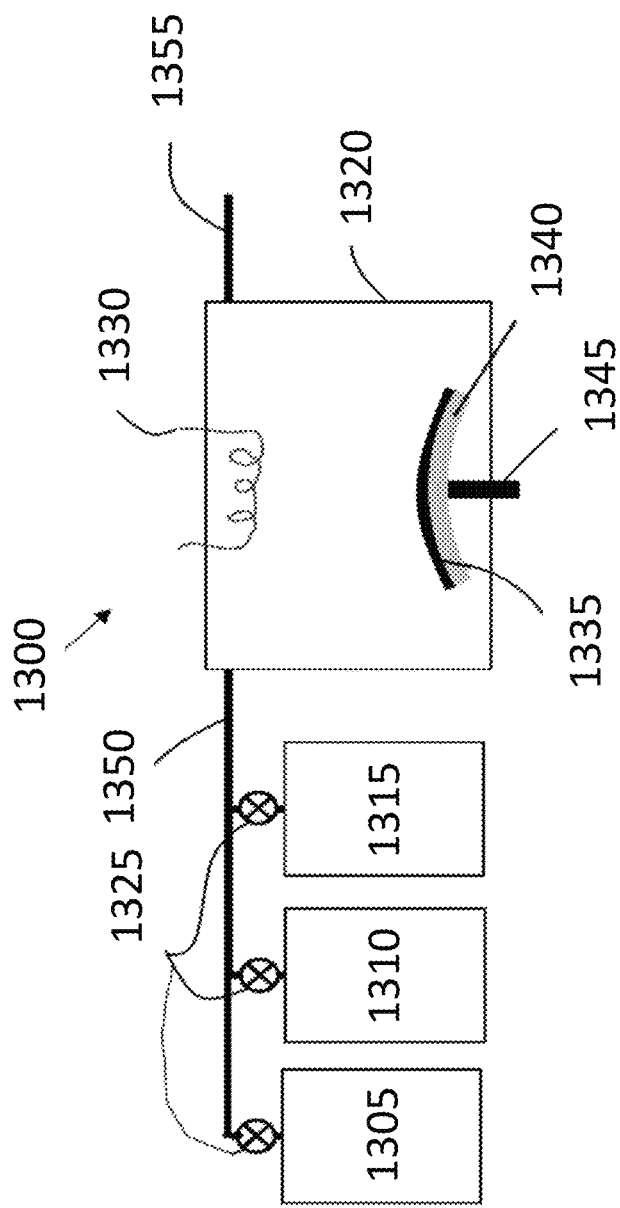
FIG. 13 is a simplified diagram showing an initiated chemical vapor deposition (iCVD) system for fabricating a curved waveguide with a graded index.

FIG. 13 is a simplified diagram showing a chemical vapor deposition (CVD) system for use in a method of making curved polymeric waveguides having a GRIN profile with a refractive index spatially varying through a thickness of the waveguide, according to an embodiment. In particular, the system 1300 shown in FIG. 13 is an initiated chemical vapor deposition (iCVD) system. In an iCVD system the monomer and initiator flow into a vacuum chamber containing an activation source. The activation source causes the initiator to break down into radicals, beginning a free-radical polymerization of the monomer at a substrate surface. By replicating solution-phase free-radical polymerization in the vapor phase, a wide variety of thin polymer films can be deposited.

Referring still to FIG. 13, the system 1300 includes an initiator source 1305, a first monomer source 1310, and a second monomer source 1315. The first monomer (also referred to as high index monomer) may be a monomer that polymerizes to form a high index polymer and the second monomer (also referred to as low index monomer) may be a monomer that polymerizes to form a low index polymer. The terms "low" and "high" are understood to be relative terms, one with respect to the other. In some embodiments, the low index monomer may have a refractive index when polymerized that is at least 0.01; at least 0.02; at least 0.05; at least 0.1; or at least 0.2 lower than the high index monomer when polymerized.

The sources 1305, 1310 and 1315 may be heated to provide a partial pressure to force initiator, first monomer and second monomer, respectively, into an iCVD chamber 1320. The flow of the initiator and monomer vapor may be controlled, for example, by valves 1325, or by a transport material such as nitrogen or an inert gas. The initiator, first monomer and second monomer enter the iCVD chamber 1320 via manifold 1350 and an outlet 1355 from iCVD chamber is provided for evacuating excess amounts thereof.

During operation, the initiator is initiated to form radicals in the iCVD chamber 1320 by a thermal or actinic source 1330. Radicals and monomers may be deposited to the substrate 1335 due to the temperature difference of the substrate 1335 and the chamber environment. The substrate 1335 temperature may be controlled by a chill plate 1340. Polymerization happens on the substrate 1335. Substrate 1335 may be flat, have a simple curvature as shown in FIG. 13, or a compound curve. If the substrate 1335 is flat, then post-deposition forming will be needed to impart the desired curved shape to the resulting intermediate waveguide structure. The substrate 1335 may be rotated, for example, using a rotating support 1345.

The ratio of the high and low refractive index monomers may be controllably varied over time to create the desired refractive index profile across the thickness of the waveguide that is formed on the substrate 1335. The iCVD process may create a continues gradient refractive index changing profile by continuously changing the monomers ratios. The iCVD process may also create a step index changing profile by step control the monomer ratios.

Figure 14:
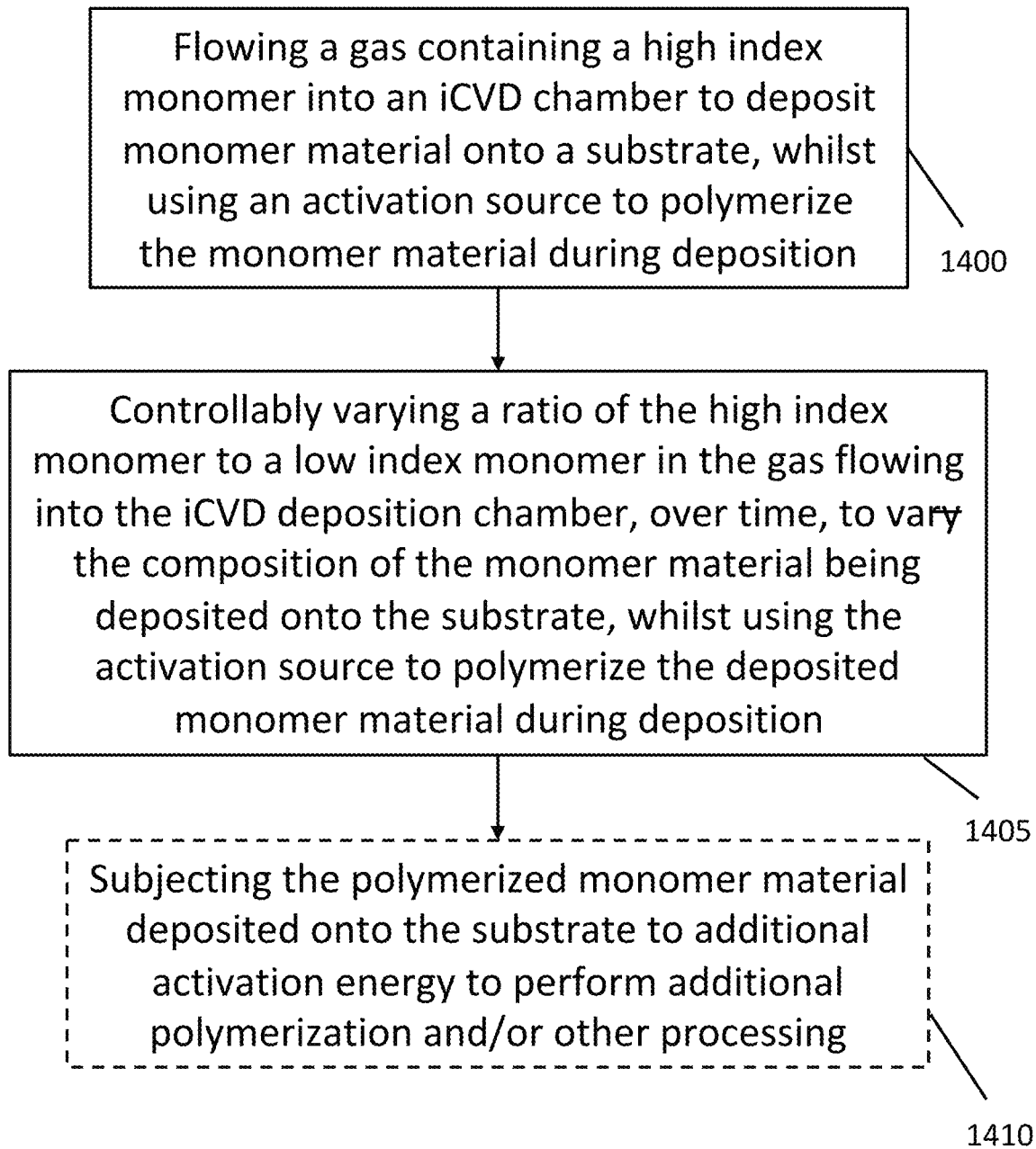
FIG. 14 is a simplified flow diagram for another method of making a curved polymeric waveguide having a graded refractive index profile with a refractive index spatially varying through a thickness of the polymeric waveguide.

Referring also to FIG. 14, a method for making a curved GRIN waveguide includes initially flowing a high index monomer from source 1310 into the iCVD deposition chamber 1320 at step 1400. Optionally, some of the low index monomer from source 1315 is also mixed with the high index monomer and introduced into the iCVD deposition chamber at step 1400, or substantially only the high index monomer from source 1310 is provided during step 1400. By way of specific and non-limiting examples, in some embodiments initially 100% high index monomer is provided into the iCVD chamber 1320 during step 1400, in some embodiments initially a mixture containing more than 95% but less than 100% high index monomer is provided into the iCVD chamber 1320 during step 1400, in some embodiments initially more than 90% but less than 100% high index monomer is provided into the iCVD chamber 1320 during step 1400. Low index monomer from source 1315, or other not illustrated monomers or additives make up the balance of the mixture provided into the iCVD chamber 1320. Of course, other compositions may be provided. Initiator from the initiator source 1305 is also provided into the iCVD chamber 1320. The activation source 1330 is used during step 1400 to provide energy for initiating the initiator mixed with the monomer in the gas phase. The initiator forms radicals, which initiate a free-radical polymerization of the monomers at the surface of substrate 1335. As such, polymerization occurs concomitantly with the deposition of monomers onto the substrate 1335 during step 1400.

After an initial deposition period, the composition of the monomer mixture provided into the iCVD chamber 1320 is controllably varied over time at step 1405 such that the relative amount of low index monomer from source 1315 increases. In some embodiments, the relative amount of low index monomer increases continuously with a concomitant continuous decrease in the relative amount of high index monomer, such that the final layers deposited at the end of the deposition process have a composition that is mostly low index monomer. By way of specific and non-limiting examples, 100% low index monomer is provided into the iCVD chamber 1320 at the end of the deposition process in step 1405, in some embodiments a mixture containing more than 95% but less than 100% low index monomer is provided into the iCVD chamber 1320 at the end of the deposition process in step 1405, in some embodiments more than 90% but less than 100% low index monomer is provided into the iCVD chamber 1320 at the end of the deposition process in step 1405. High index monomer from source 1310, or other not illustrated monomers or additives make up the balance of the mixture provided into the iCVD chamber 1320. Of course, other compositions may be provided. Once again, initiator from the initiator source 1305 is also provided into the iCVD chamber 1320. The activation source 1330 is used during step 1405 to provide energy for initiating the initiator mixed with the monomer in the gas phase. The initiator forms radicals, which initiate a free-radical polymerization of the monomers at the surface of substrate 1335. As such, polymerization occurs concomitantly with the deposition of monomers onto the substrate 1335, and optionally is completed, during step 1405.

At optional step 1410 (dashed box in FIG. 14) the polymerized material deposited on the substrate 1335 may be subjected to additional processing to ensure that the deposited material is fully polymerized and/or possesses desired physical properties. In an embodiment, the deposited material is subjected to the additional processing within the iCVD chamber 1320. For instance, the activation source 1330 or a separate energy source (not shown) is used to provide energy to cause additional polymerization and/or hardening of the deposited material, after the deposition step 1405 is completed. Alternatively or additionally, an external energy source (not shown) is used to perform additional processing of the deposited material external to the iCVD chamber 1320, either before or after removing the deposited material from the substrate 1335.

In some embodiments, a curved waveguide with GRIN profile is obtained having a variation of the refractive index along the thickness axis (direction of deposition of successive layers) is at least 0.001/µm; at least 0.002/µm; at least 0.005/µm; at least 0.01/µm; at least 0.05/µm; or at least 0.1/µm.

In some embodiments, curved waveguide with GRIN profile is obtained having a ratio of a length of the waveguide along a length dimension thereof to a thickness thereof, and a ratio of a width of the waveguide along a width dimension thereof to the thickness thereof, are both at least 10:1.

The preceding paragraphs describe an iCVD deposition method in which the resulting waveguide structure has a refractive index profile that changes monotonically. For instance, the refractive index increases or decreases continuously between the major surfaces of the resulting curved waveguide structure along a thickness dimension thereof, wherein the thickness dimension is along the direction of adjacent layer deposition. The refractive index profile may follow a linear relationship, a parabolic relationship, a hyperbolic relationship, a Gaussian relationship or some other relationship. By way of a specific and non-liming example, the refractive index may decrease from 1.68 at the first major surface (e.g., concave side) to 1.60 at the second major surface (e.g., convex side).

In some embodiments, initially high index monomer from source 1310 is provided into the iCVD chamber 1320 as described above, and the composition of the monomer mixture is varied until mostly low index monomer from source 1315 is being deposited. Further deposition may then continue, during which the composition of the monomer mixture that is provided into the iCVD chamber 1320 is controllably varied such that the relative amount of low index monomer from source 1315 decreases again, with a concomitant continuous increase in the relative amount of high index monomer, such that the final layers deposited at the end of the deposition process in step 1405 have a composition that is mostly high index monomer. The resulting waveguide structure may have a central layer between the first and second major surfaces thereof, and the refractive index of the central layer is lower than the refractive index adjacent to the first major surface and the second major surface. The graded refractive index profile may be asymmetric or symmetric about the central layer. In some embodiments, the refractive index at the central layer is at least 0.01; at least 0.02; at least 0.05; or at least 0.10 lower than a refractive index adjacent to the first major surface and/or the second major surface.

The system shown in FIG. 13 may be used to fabricate waveguides having a final thickness that is from several microns to several mm. In some embodiments, the substrate 1335 may be heated during deposition to reduce internal strain in the waveguide. Alternatively, the waveguide may be heated after formation to reduce internal stress.

In FIG. 13, the source 1310 may contain a high refractive index monomer that is a polymer precursor used to make, for example, polycarbonate, polyesters such as polyethylene terephthalate, polyethylene naphthalate, along with suitable glycols, polymers with sulfur groups including thioether, sulfone, cyclic thiophene, thiadiazole, and thianthrene, halogen groups including bromine and iodine, phosphonates and phosphazenes, or nanocomposites, and mixtures and copolymers thereof. In some embodiments, the source 1310 may contain a high refractive index monomer that is a polymer precursor used to make, for example, Poly(pentabromophenyl methacrylate) (PPBPMA), Poly(pentabromophenyl acrylate), Poly(pentabromobenzyl methacrylate), Poly(pentabromobenzyl acrylate), Poly(2,4,6-tribromophenyl methacrylate), Poly(vinylphenylsulfide), Poly(1-napthyl methacrylate), Poly(2-vinylthiophene), Poly(2,6-dichlorostyrene), Poly(N-vinylphthalimide), Poly(2-chlorostyrene), and Poly(pentachlorophenyl methacrylate).

In FIG. 13, the source 1315 may contain a low index monomer including acrylates, fluoroacrylates and other monomers containing fluorine, silicones. The low refractive index monomer may be a polymer precursor used to make, for example, Poly(1,1,1,3,3,3-hexafluoroisopropyl acrylate) (PHFIA), Poly(2,2,3,3,4,4,4-heptafluorobutyl acrylate), Poly(2,2,3,3,4,4,4-heptafluorobutyl methacrylate), Poly(2,2,3,3,3-pentafluoropropyl acrylate), Poly(1,1,1,3,3,3-hexafluoroisopropyl methacrylate), Poly(2,2,3,4,4,4-hexafluorobutyl acrylate), Poly(2,2,3,4,4,4-hexafluorobutyl methacrylate), Poly(2,2,3,3,3-pentafluoropropyl methacrylate), Poly(2,2,2-trifluoroethyl acrylate), Poly(2,2,3,3-tetrafluoropropyl acrylate), Poly(2,2,3,3-tetrafluoropropyl methacrylate), and Poly(2,2,2-trifluoroethyl methacrylate).

Preferably, the monomers used with the system shown in FIG. 13 do not phase-separate when copolymerized. For example, and by way of a specific example only, it may be desirable to use a fluoroacrylate monomer such as 1H,1H,5H-octafluoropentyl methacrylate for a low index monomer and 2,4,6-tribromophenyl acrylate, benzyl methacrylate, or 2-((1,3-dithiolan-2-yl)methylthio)ethyl methacrylate for the high refractive index monomer.

In the system shown in FIG. 13, monomer vapor from the sources 1310 and 1315 may be controllably transferred to the iCVD chamber 1320 via manifold 1350 due to the vapor pressure of the respective monomers, optionally increased by heating, or using a carrier gas, including gas passed over or under the surface of the monomers.

Although FIG. 13 illustrates specifically an initiated chemical vapor deposition system, other suitable deposition methods may be used instead, such as for instance non-initiated CVD (traditional CVD) or plasma CVD.

Non-initiated (traditional) CVD may be performed with polymerization starting inside or outside the CVD chamber. An initiator, first monomer, and second monomer are vaporized and mixed in the proper ratio to achieve a target refractive index. The vapor mixture is deposited onto a substrate (flat or curved). The deposited mixture may be exposed to an actinic source to polymerize the thin layer that has been formed on the substrate. After the first layer is polymerized, a mixture of the initiator, first monomer and second monomer with a different ratio, which is targeted for different refractive index, is deposited and polymerized by the actinic source as a second layer. Further layers having different target refractive indices can be built up by repeating the deposition and polymerization steps. Controllably varying the ratio of the first and second monomers for each layer achieves a desired refractive index profile within the finished component. The traditional CVD process may create a step index, changing the refractive index profile in steps by controlling the monomer ratios in the different layers.

Plasma CVD may be performed, again with the first monomer and the second monomer being vaporized and mixed in the proper ratio for targeted refractive index at each stage of the deposition process. The monomer vapor mixture is initiated by plasma radiation. The monomer vapor mixture is deposited onto a substrate (flat or curved) in a deposition chamber, and the monomers are polymerized. The plasma CVD process may create a continues gradient refractive index profile by continuously changing the monomers ratios. The plasma CVD process may also create a step index changing profile by step control the monomer ratios.

Example 3

Diffusion from One Side

In some embodiments, a curved waveguide with uniform refractive index may fabricated initially by molding or thermal setting. One side of the initially formed curved waveguide may be protected from exposure to the environment. The protected waveguide may then be soaked in a monomer/initiator bath containing a different index monomer, lower or higher than the uniform refractive index of the initially formed waveguide. The monomer and the initiator are then allowed to diffuse from the unprotected side of the curved waveguide toward the inside of the waveguide. Due to the diffusion gradient that results during this process, a gradient of index of refraction may be formed in the final curved waveguide upon removing the protected waveguide from the bath and exposing it to an actinic source to polymerize the monomers and lock down the refractive index profile.

Example 4

Dip Coat

A layer-by-layer dip coating or spray coating approach may also be performed to build up a layer with a graded refractive index profile. Suitable coating solutions include: a polymer with solvent; monomer/initiator with solvent; or monomer/initiator without solvent. After each coating, solvent is removed by elevated temperature, if applied. The coating may be further polymerized by exposure of a thermal or actinic source, if monomer is involved. After one layer is dried, a second layer may be applied by repeating the same produce but with a different coating solution to achieve different refractive index.

Example 5

Polymer Co-Extrusion

In an alternate embodiment, a substrate supports at least a first and a second polymer coextruded to form a stack of at least three alternating layers of polymer sheets heated at or above the glass transition temperature of the first and second polymer. The stack of polymers may be allowed to diffuse into each other, and the substrate may be heated until the stack reaches the desired refractive index profile. The first and second polymer may have substantially similar solubility parameters.

In a different embodiment, a low molecular weight solvent or plasticizer may be added to the first and second resin to promote diffusion. For example, the stack of polymers may be heated in the presence of an organic or inorganic material that is absorbed into the stack. The solvent or plasticizer may be removed from the stack after the diffusion is complete. In one example, the first and second polymer include polyacrylates (e.g. polymethylmethacrylate and poly (2,2,2-trifluoroethyl methacrylate)), polyesters (e.g. polyethylene terephthalate and poly(2,6-ethylene naphthalate), isophthalate copolymers), and some other miscible polymer resins from the families of polycarbonates, polysilicones, polyolefins, polystyrenes, polyfluorocarbons, and some combination thereof.

Figure 15:
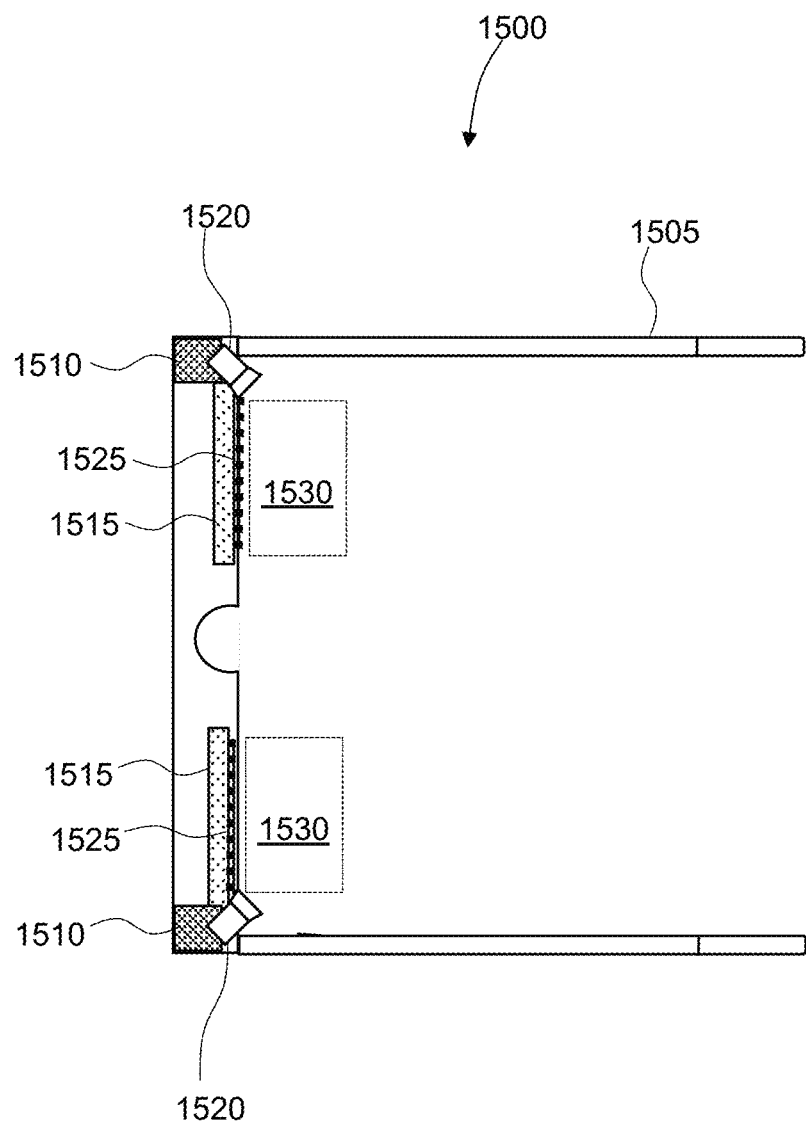
FIG. 15 is a plan schematic view of a near-eye display using waveguides of this disclosure.

Turning now to FIG. 15, an augmented reality (AR) near-eye display 1500 includes a frame 1505 having a form factor of a pair of eyeglasses. The frame 1505 supports, for each eye: a projector 1510, a pupil-replicating waveguide 1515 optically coupled to the projector 1510, an eye-tracking camera 1520, and a plurality of illuminators 1525. The pupil-replicating waveguide 1515 may include any of the waveguides disclosed herein. The illuminators 1525 may be supported by the pupil-replicating waveguide 1515 for illuminating an eyebox 1530. The projector 1510 provides a fan of light beams carrying an image in angular domain to be projected into a user's eye. The pupil-replicating waveguide 1515 receives the fan of light beams and provides multiple laterally offset parallel copies of each beam of the fan of light beams, thereby extending the projected image over the eyebox 1530. For AR applications, the pupil-replicating waveguide 1515 can be transparent or translucent to enable the user to view the outside world together with the images projected into each eye and superimposed with the outside world view. The images projected into each eye may include objects disposed with a simulated parallax, so as to appear immersed into the real-world view.

The purpose of the eye-tracking cameras 1520 is to determine position and/or orientation of both eyes of the user. Once the position and orientation of the user's eyes are known, a gaze convergence distance and direction may be determined. The imagery displayed by the projectors 1510 may be adjusted dynamically to account for the user's gaze, for a better fidelity of immersion of the user into the displayed augmented reality scenery, and/or to provide specific functions of interaction with the augmented reality. In operation, the illuminators 1525 illuminate the eyes at the corresponding eyeboxes 1530, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 1530.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Throughout the description and claims of this specification, the words "comprise", "including", "having" and "contain" and variations of the words, for example "comprising" and "comprises" etc., mean "including but not limited to", and are not intended to, and do not exclude other components.

It will be appreciated that variations to the foregoing embodiments of the disclosure can be made while still falling within the scope of the disclosure. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the disclosure are applicable to all aspects of the disclosure and may be used in any combination. Likewise, features described in non-essential combinations may be used separately (not in combination).

The invention claimed is:

1. A method of making a curved polymeric waveguide having a graded refractive index profile with a refractive index spatially varying through a thickness of the polymeric waveguide, the method comprising:
    forming a stacked structure comprising at least a layer of a first resin and a layer of a second resin, the first resin having a first refractive index when polymerized and the second resin having a second refractive index when polymerized that is different than the first refractive index;
    allowing the first resin and the second resin to diffuse into one another to form a composite resin structure in which a ratio of the second resin to the first resin in the composite resin varies in a thickness dimension of the stacked structure;
    polymerizing the composite resin structure; and
    forming the polymerized composite resin structure into a pre-defined curved shape;
    whereby the curved polymeric waveguide has a refractive index monotonically decreasing through a thickness thereof from a concave surface of the curved polymeric waveguide to a convex surface of the curved polymeric waveguide.

2. The method of claim 1, wherein forming the stacked structure comprises:
    flowing the first resin into a first inlet of a plurality of inlets at a first end of a diffusion channel, the diffusion channel including an outlet at a second end opposite to the first end and separated from the plurality of inlets by a channel length; and
    flowing the second resin into a second inlet of the plurality of inlets, the flowing of the second resin being directed along a first periphery of the first resin,
    wherein the first resin and the second resin diffuse into one another over the channel length between the plurality of inlets and the outlet.

3. The method of claim 1, wherein the first resin and the second resin are selected from a group consisting of: a polyacrylate, a polyurethane, a polysilicone, a polyester, a polyolefin, a polyamide, a polycarbonate, copolymers thereof, and mixtures thereof.

4. The method of claim 1, wherein the pre-defined curved shape includes a portion of a sphere.

5. The method of claim 1, wherein the pre-defined curved shape includes a portion of a cylinder.

6. The method of claim 1, further comprising forming a layer of a third resin along a second periphery of the first resin that is opposite the first periphery, such that the first resin is disposed between the second resin and the third resin in the stacked structure, the third resin having a third refractive index when polymerized that is different than the first refractive index.

7. The method of claim 6, wherein the first refractive index is higher than the third refractive index, and the second refractive index is lower than the first refractive index.

8. The method of claim 7, wherein the first refractive index is lower than or equal to the third refractive index.

9. A method of making a curved waveguide having a graded refractive index profile with a refractive index spatially varying through a thickness of the curved waveguide, the method comprising:
    providing a substrate in a deposition chamber;
    introducing a monomer containing vapor into the deposition chamber and depositing material from the monomer containing vapor onto a surface of the substrate over a period of time;
    controllably varying a ratio of an amount of a first monomer to an amount of a second monomer in the monomer containing vapor over the period of time, such that a-composition of the material that is deposited on the substrate changes over the period of time,
    wherein the first monomer has a first refractive index when polymerized, and the second monomer has a second refractive index when polymerized, the second refractive index being different than the first refractive index; and
    polymerizing the material deposited on the substrate;
    whereby the curved waveguide has a refractive index monotonically decreasing through a thickness thereof from a concave surface of the curved waveguide to a convex surface of the curved waveguide.

10. The method of claim 9, wherein the surface of the substrate has a curved shape that includes a portion of a sphere.

11. The method of claim 9, wherein the surface of the substrate has a curved shape that includes a portion of a cylinder.

12. The method of claim 9, wherein the monomer containing vapor comprises an initiator.

13. The method of claim 12, wherein depositing material from the monomer containing vapor onto the substrate further comprises initiating the initiator using an actinic source to provide energy for initiating the initiator to form radicals.

14. The method of claim 12, wherein depositing material from the monomer containing vapor onto the substrate further comprises initiating the initiator using a thermal source to provide energy for initiating the initiator to form radicals.

15. The method of claim 9, wherein the surface of the substrate has a convex shape, and wherein the ratio of the amount of the first monomer to the amount of the second monomer in the monomer containing vapor decreases over the period of time.

16. The method of claim 15, wherein the first refractive index is greater than the second refractive index.

* * * * *